US006618199B2

(12) United States Patent
Cook

(10) Patent No.: US 6,618,199 B2
(45) Date of Patent: Sep. 9, 2003

(54) DUAL-BAND FABRY-PEROT MIRROR COATING

(75) Inventor: Christopher C. Cook, Bedford, MA (US)

(73) Assignee: Axsun Technologies, Inc., Billerica, MA (US)

(*) Notice: Subject to any disclaimer, the term of this patent is extended or adjusted under 35 U.S.C. 154(b) by 0 days.

(21) Appl. No.: 09/874,760

(22) Filed: Jun. 5, 2001

(65) Prior Publication Data

US 2002/0181107 A1 Dec. 5, 2002

(51) Int. Cl.[7] ............................. G02B 5/28; G02B 27/00
(52) U.S. Cl. ........................ 359/578; 359/577; 359/580; 359/584; 359/586; 359/590
(58) Field of Search ................................. 359/577, 578, 359/579, 584, 585, 588, 589, 590, 260, 586, 580; 356/454, 519; 349/198; 372/20

(56) References Cited

U.S. PATENT DOCUMENTS

| 3,641,344 | A | * | 2/1972 | Markle | 250/458.1 |
| 4,952,025 | A | * | 8/1990 | Gunning, III | 359/586 |
| 5,291,332 | A | * | 3/1994 | Siebert | 356/519 |
| 5,418,641 | A | * | 5/1995 | Hendow et al. | 356/519 |
| 5,550,373 | A | * | 8/1996 | Cole et al. | 250/338.1 |
| 5,615,289 | A | * | 3/1997 | Duck et al. | 385/24 |
| 6,301,042 | B1 | * | 3/2002 | Pelekhaty | 359/359 |
| 6,538,748 | B1 | * | 3/2003 | Tucker et al. | 356/519 |
| 6,546,029 | B2 | * | 4/2003 | Sirbu et al. | 372/20 |
| 2002/0031155 | A | * | 6/1998 | Tayebati et al. | 372/50 |
| 2002/0150130 | A1 | * | 10/2002 | Coldren et al. | 372/20 |

FOREIGN PATENT DOCUMENTS

| WO | 00/63728 | 10/2000 | ............ G02B/5/28 |
| WO | 01/04670 | 1/2001 | ............ G02B/5/28 |

OTHER PUBLICATIONS

J. S. Patel, et al., "Multiwavelength Tunable Liquid–Crystal Etalon Filter", IEEE Photonics Techn. Lett., vol. 3, No. 7, Jul. 1991, pp. 643–644.*
M. W. Maeda, et al., "Wavelength–Division Multiple–Access Network Based on Centralized Common–Wavelength Control", IEEE Photonics Techn. Lett., vol. 5, No. 1, Jan. 1993, pp. 83–85.*
Thelen, Alfred, *Design of Optical Interference Coatings*, 1989 New York, Chapter 6 "Edge Filters", pp. 127–146. McGraw–Hill Book Company.

* cited by examiner

*Primary Examiner*—John Juba
(74) *Attorney, Agent, or Firm*—S. Grant Houston

(57) ABSTRACT

A Fabry-Perot filter has at least two mirror structures defining a resonant cavity. This filter is tunable by modulating an optical distance between the mirror structures. To accommodate a wide bandwidth of operation or accommodate two spectral bands, the mirror structures are made from two stacked, single-band mirrors. In more detail, the mirror structures comprise a substrate; a first mirror is deposited on the substrate, with an index matching coating between the substrate and the first mirror. The second mirror is stacked on the first mirror. The mirrors are symmetric relative to each other, such that the index of a first mirror in the second spectral band has an effective index of about one. In contrast, the second mirror has an effective index of about one in the first spectral band.

10 Claims, 7 Drawing Sheets

DUAL-BAND FABRY-PEROT MIRROR COATING

BACKGROUND OF THE INVENTION

Tunable Fabry-Perot etalons are used as bandpass filters. The basic configuration includes at least two mirror structures defining a resonant cavity, in which the optical length of the cavity can be modulated.

In one application, the Fabry-Perot (FP) tunable filters are used to monitor wavelength division (WDM) systems. A mode of the tunable filter is scanned across the signal band of a WDM signal. A detector is used to detect the optical power during these scans. In other applications, the FP filters are used in channel add/drop devices. Commonly, two cavity Fabry-Perot filters are useful in these situations because of their top hat filtering profile.

Sometimes reference signal sources are used in conjunction with FP filters. The signal source generates a reference signal in a reference band, the reference signal having temporally stable and known spectral features. The tunable filter is scanned across these features. This provides information concerning the absolute passband of the tunable filter during a subsequent scan in the signal band.

SUMMARY OF THE INVENTION

In some applications, a relatively wide bandwidth FP filter is required. This can occur various situations. Sometimes the signal band is spectrally wide or scanning across two separate signal bands, such as the L and C bands in the ITU grid, is required. In other applications, the reference band is spectrally separated from the signal band. In still other implementations, the spectral distance between bands may even be greater than the free spectral range of the filter. In such cases, a mode in one order of operation of the tunable filter is used to scan one band, whereas a mode in another order of operation is used to scan the other band.

One problem that arises when fabricating FP filters that must accommodate these wide spectral bands concerns the construction of the mirror structures, and specifically the optical coatings. The mirror structures are typically fabricated from dielectric thin film coatings of alternating high and low index dielectric films. Thickness of these films is controlled to be approximately one quarter of a wavelength of the radiation to be reflected. This wavelength dependency conflicts with the need for a wide bandwidth. Generally, it is difficult to fabricate a thin film dielectric mirror that operates across a bandwidth of greater than about 300 nanometers (nm) in the communications wavelengths around 1550 nm.

To address these issues, the present invention is directed to an FP filter that comprises at least two mirror structures defining a resonant cavity. This filter is tunable by modulating an optical distance between the mirror structures. To accommodate a wide bandwidth of operation or accommodate two discrete spectral bands, the mirror structures are made from two stacked, single-band thin film mirrors.

In the current implementation, one of the mirror structures is located on a deflectable micro electromechanical system (MEMS) structure. Specifically, a MEMS membrane is deflected by electrostatic forces to thereby tune the optical distance between the mirror structures. Also, the mirror structures preferably define a curved/flat optical cavity.

In the preferred embodiment, each single band mirror is preferably constructed from multi-layer thin film dielectric mirror coating. One of the mirrors is designed to be reflective in a first spectral band whereas the second mirror is designed to be reflective in a second, different spectral band. For example, the first spectral band is a reference band and the second spectral band is a signal band, in one implementation.

In more detail, the mirror structures each comprise a substrate. The first mirror of each structure is deposited on the substrate, with an index matching coating between the substrate and the first mirror. The second mirror is stacked on the first mirror. The mirrors are symmetric relative to each other, such that the index of a first mirror in the second spectral band has an effective index of about one. In contrast, the second mirror has an effective index of about one in the first spectral band.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
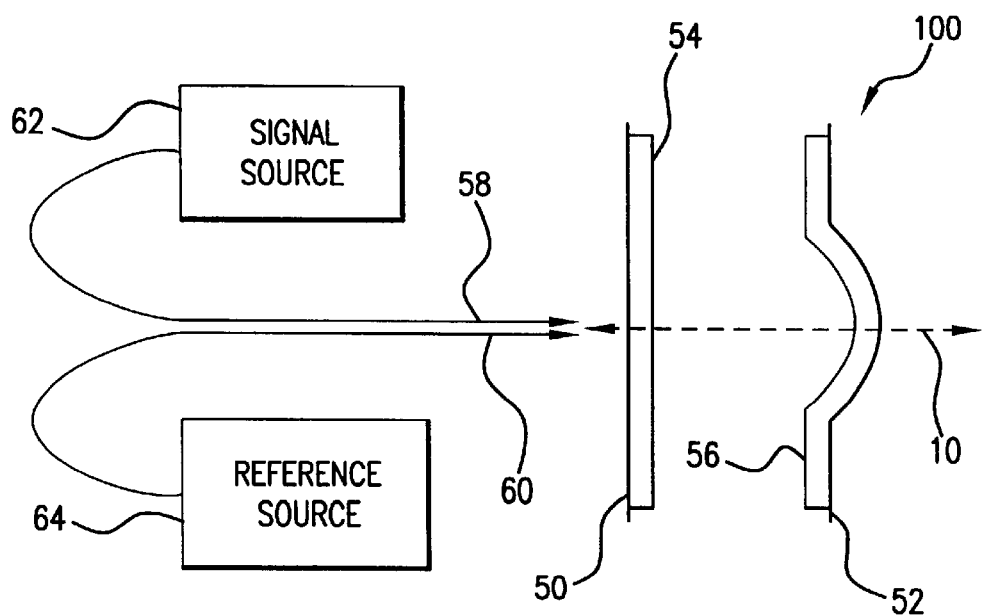
FIG. 1 is a schematic view of a curved, flat Fabry-Perot filter.

FIG. 1 is a schematic view of a Fabry-Perot tunable filter 100 to which the principles of the present invention are applied in one example.

Specifically, the tunable filter comprises two mirror structures 50, 52. In the illustrated implementation, mirror structure 50 is substantially or relatively flat. Mirror structure 52 is curved, at least surrounding the optical axis 10.

Each mirror structure 50, 52 comprises a thin film dielectric mirror coating 54, 56. According to the invention, each of these mirror coatings comprises two stacked single band mirrors.

In a current implementation, a signal source 62 generates a communications signal that is spectrally located within a signal band. The reference source 64 generates a reference signal that is located within a reference band. The two signals, communications signal 58 and reference signal 60, are launched into the Fabry-Perot filter 100.

In an alternative implementation, instead of a reference source 64, a second signal source operating in a second signal band replaces a reference source 64.

Figure 2:
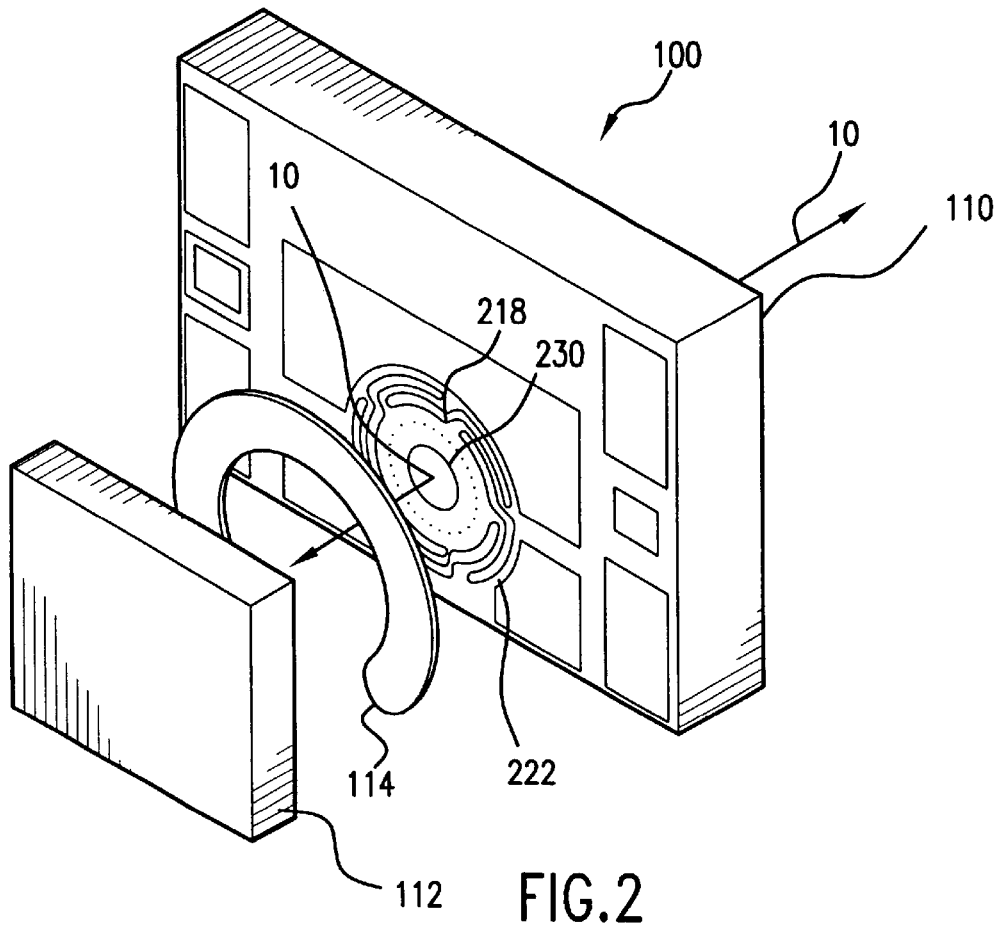
FIG. 2 is an exploded view of an exemplary MEMS tunable filter to which the principles of the present invention can be applied in one example.

FIG. 2 illustrates one MEMS implementation of the tunable filter 100.

Generally, the MEMS filter 100 comprises a membrane device 110 that is separated from a mirror device 112 by a spacer 114. Depending on the implementation, the curved mirror structure 52 and corresponding mirror coating 56 can be located either on the membrane 222 with the mirror coating 230 functioning as the mirror 56. In this case, the function of the flat mirror structure 50 with flat mirror 54 is performed by the mirror device 112. In an alternative implementation, the function of the curved mirror structure 52 with the mirror coating 56 is performed by the mirror device 112, with the flat mirror structure 50 being located on the membrane 222. In either case, the membrane body 218 is electrostatically deflectable for out-of-plane deflection to thereby tune the Fabry-Perot filter 100.

Returning to FIG. 1, according to the present invention, the coatings 54, 56 of the Fabry-Perot filter 100 are constructed to enable two spectral bands to resonate simultaneously in the cavity. The total spectral width of these spectral bands is too large to fall within the is normal bandwidth of a single band mirror coating, however.

The building separate mirror coatings, each designed to operate at one of the bands, is generally not possible due to interference from the out-of-band resonances of each mirror, which create coupled cavity effects that spoil the cavities.

According to the invention, the mirror coatings 54, 56 comprise two stacked single-band Fabry-Perot mirrors in which the two stacked single-band Fabry-Perot mirrors 54, 56 are co-designed using equivalent indices of refraction.

Figure 3:
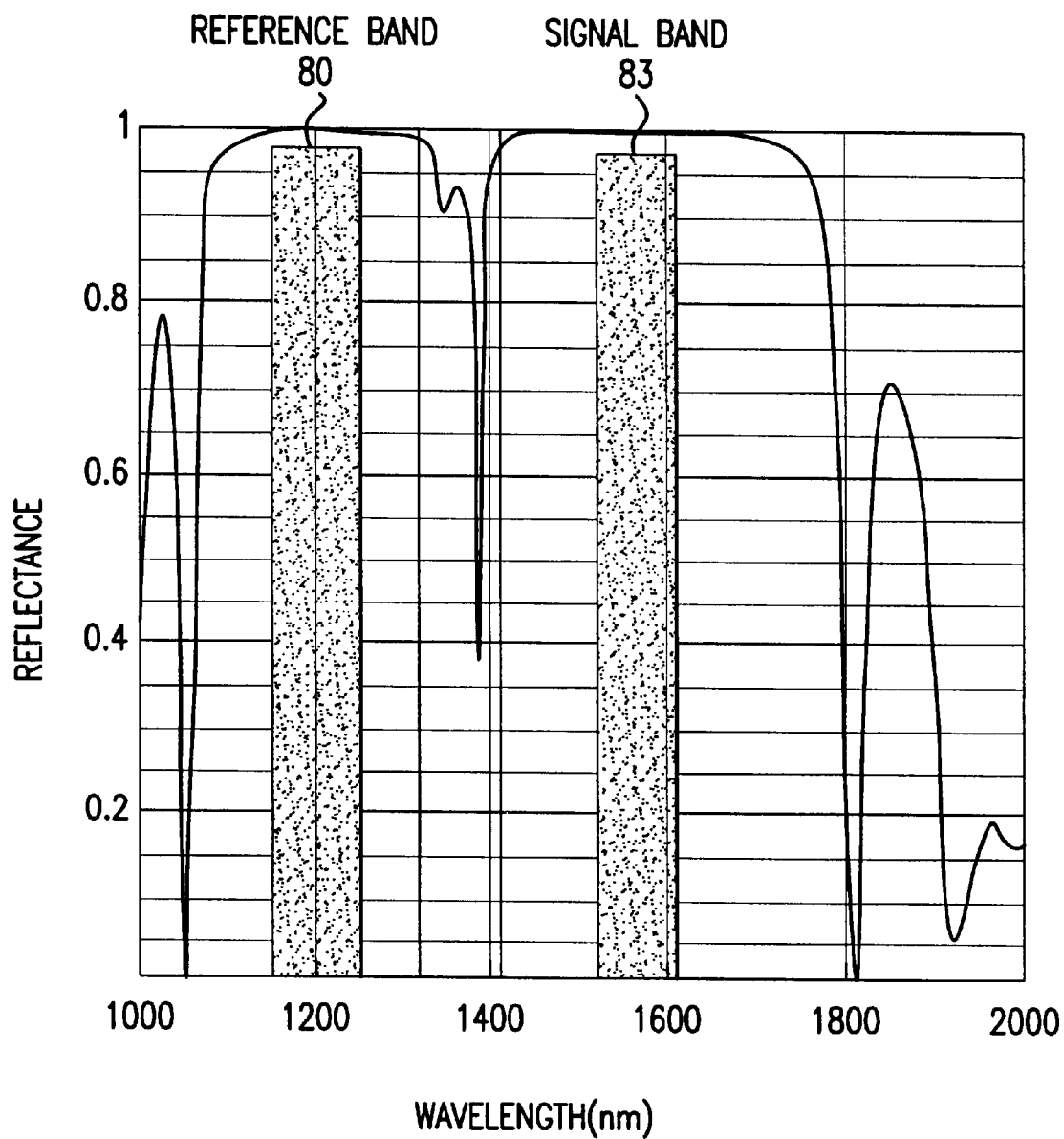
FIG. 3 is a plot of reflectance as a function of wavelength illustrating the reflectance of a dual-band mirror coating according to the present invention.

FIG. 3 is a plot of the net reflectance of the stacked single-band mirror coatings 54, 56 according to the present invention. In the example, the reflectance peaks in the reference band 80 at approximately 1200 nanometers and in the signal band 82 at about 1550 nanometers.

According to the invention, the effective index of the portion of the mirror coating associated with the reference band in the signal band is approximately 1. As a result, the reference mirror coating does not spoil the Fabry-Perot cavity in the signal band. Further, according to the invention, the effective index of the signal mirror coating in the reference band is about 1.0. This yields de-coupled mirrors.

According to the invention, the mirrors are generally arranged as follows: substrate-reference mirror-signal mirror-air. Preferably, an index match is placed between the substrate and the reference mirror to decouple the stacked mirrors from the substrate and minimize insertion loss.

In more detail, the following mirror coating design is used: substrate (i.e., silicon or air)[index match][(H/2 L H/2)$^{N1}$(at reference wavelength)][(L/2 H L/2)$^{N2}$(at signal wavelength)]air. Here, H and L refer to quarter wave optical thicknesses of high index and low index materials, respectively, N1 and N2 are the number of repeat periods chosen for the given cavity. In the present implementation N1 and N2 are in the range of 7 to 20.

Further, generally for the mirror, $\Delta n/2n_H < \Delta\lambda/\lambda_{ave}$, where $n_H$ is the index of refraction of the high index material, $n_L$ is the index of refraction for the low index material, $\Delta n = n_H - n_L$, $\lambda_{ave}$ is the average wavelength between the signal band and reference band centers, and $\Delta\lambda$ is the difference between the signal band center and the reference band center. Further, it is often required that T(ref)/T(sig) be less than 10. The desired values (or ratios) are obtained via selection of $N_1$ and $N_2$.

Figure 4:
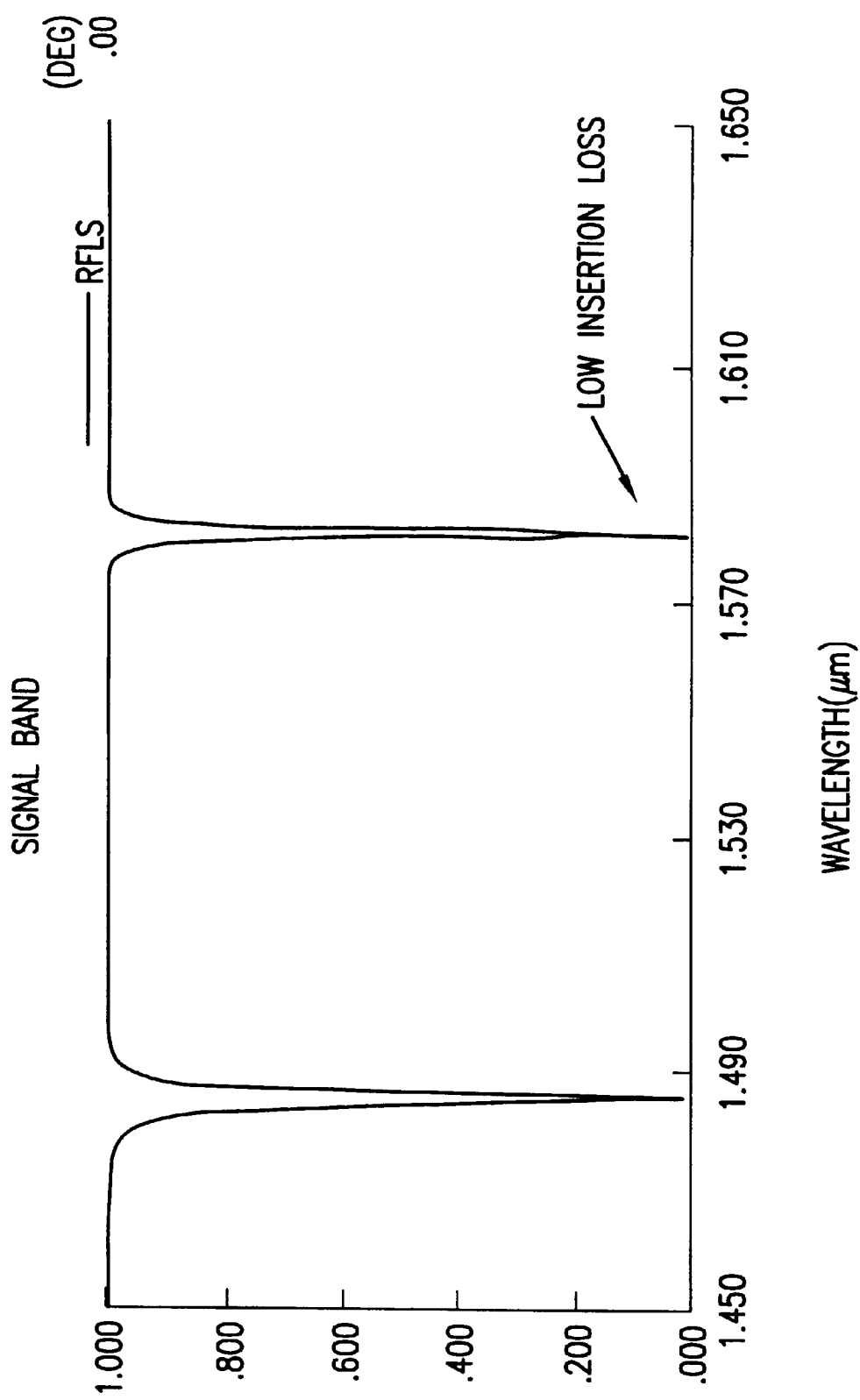
FIG. 4 is a plot of reflectance as a function of wavelength in the signal band for a modeled mirror structure.

FIG. 4 is the modeled reflectance of specific implementations of the coatings 54, 56 in the wavelength band. Typically, the reflectance is relatively stable from 1490 to greater than 1570 nanometers (nm). In one example, this covers the C and S bands in the ITU grid.

Figure 5:
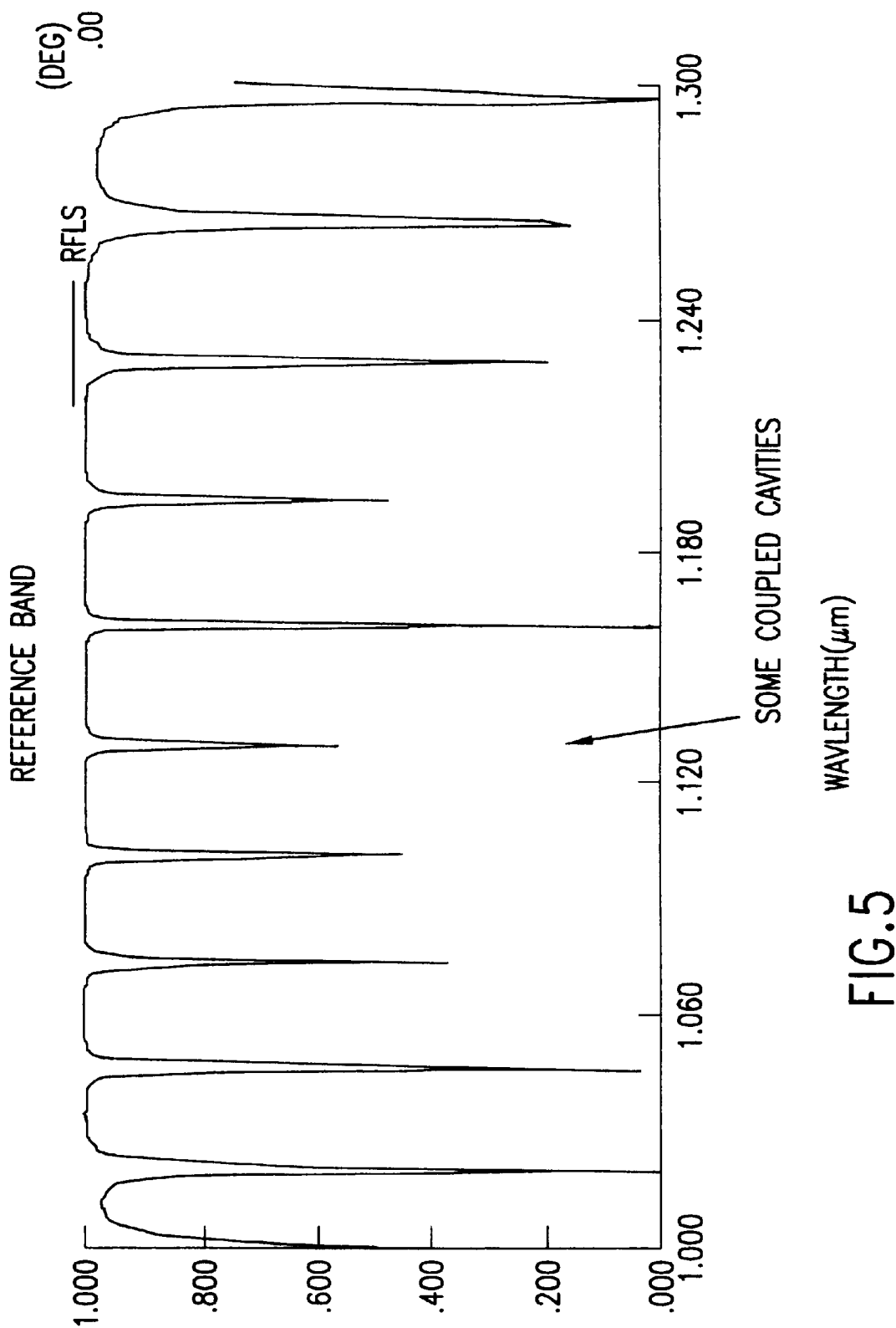
FIG. 5 is a plot of reflectance as a function of wavelength in the reference band for the modeled mirror structure.

FIG. 5 illustrates the performance in the reference signal band. The periodic notches are due to the existence of some coupled cavities. This is caused by the placement of the reference band mirror under the signal band mirror. The existence of these notches, however, is less of a problem in the reference band where noncontinuous reflectance can be addressed through calibration of the sub-system.

Figure 6:
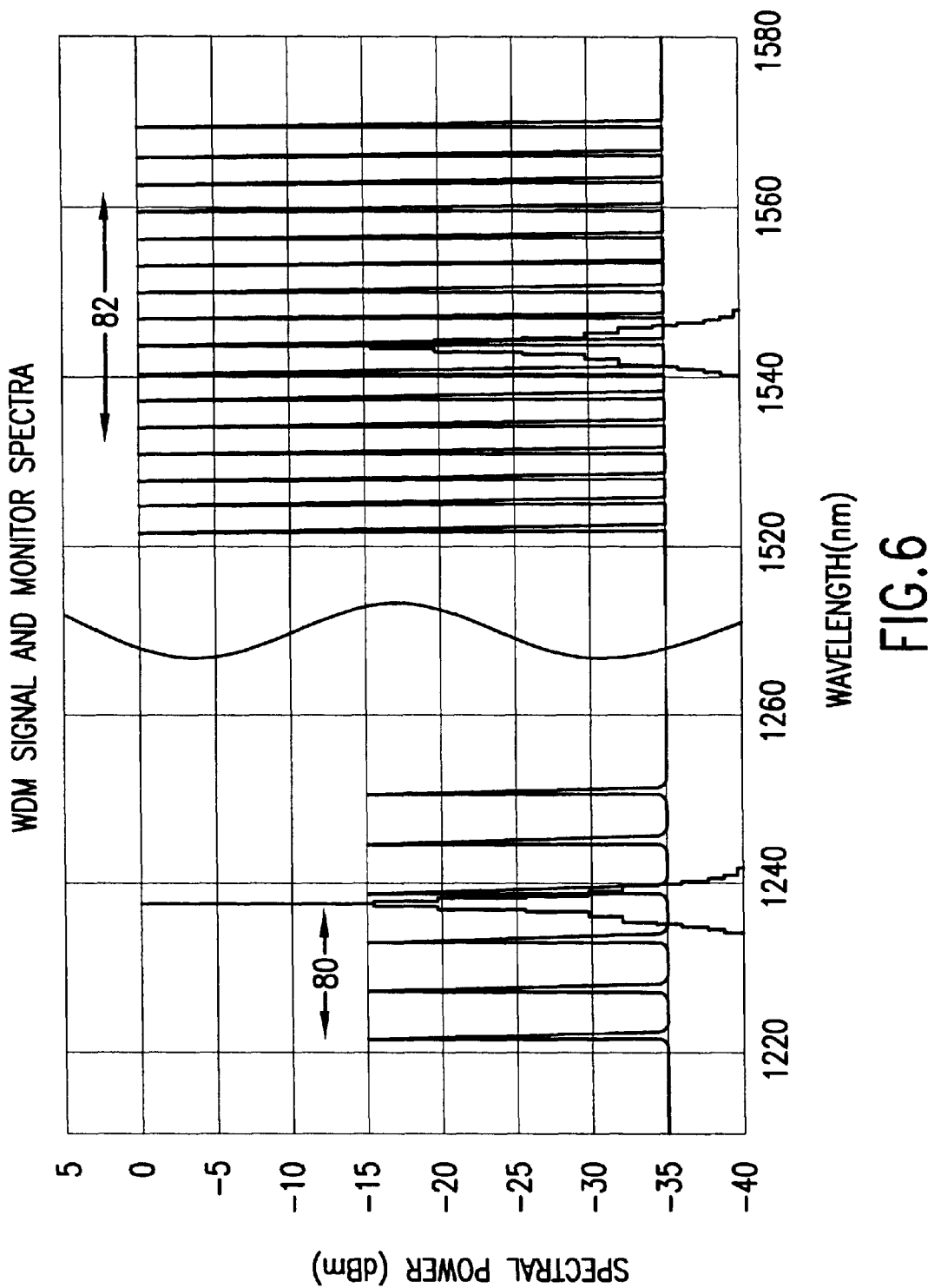
FIG. 6 is a plot of spectral power as a function of wavelength illustrating the signal band, reference band, and the modes of the tunable filter for two orders of operation.

FIG. 6 illustrates one mode of operation for the exemplary tunable filter system. Specifically, the signal in a signal band is scanned with a mode in one order of operation of the tunable filter while another mode in another order of operation scans the reference signal band.

Figure 7:
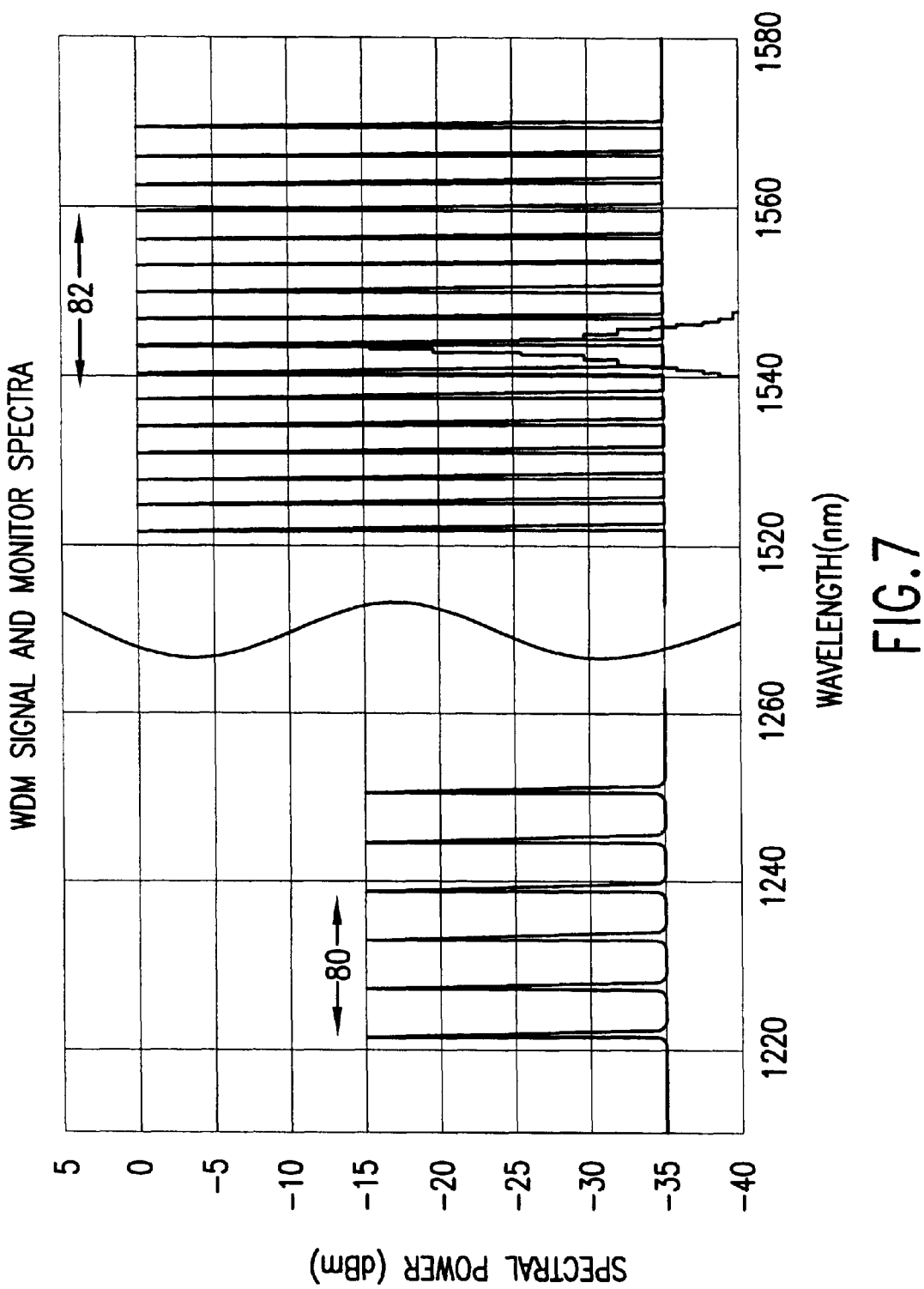
FIG. 7 is plot of spectral power as a function of wavelength showing the signal band, the reference band, and a mode for one order of operation of the tunable filter.

As illustrated in FIG. 7, in another configuration, a single mode of the tunable filter scanned across the reference band and the signal band successively.

Figure 8:
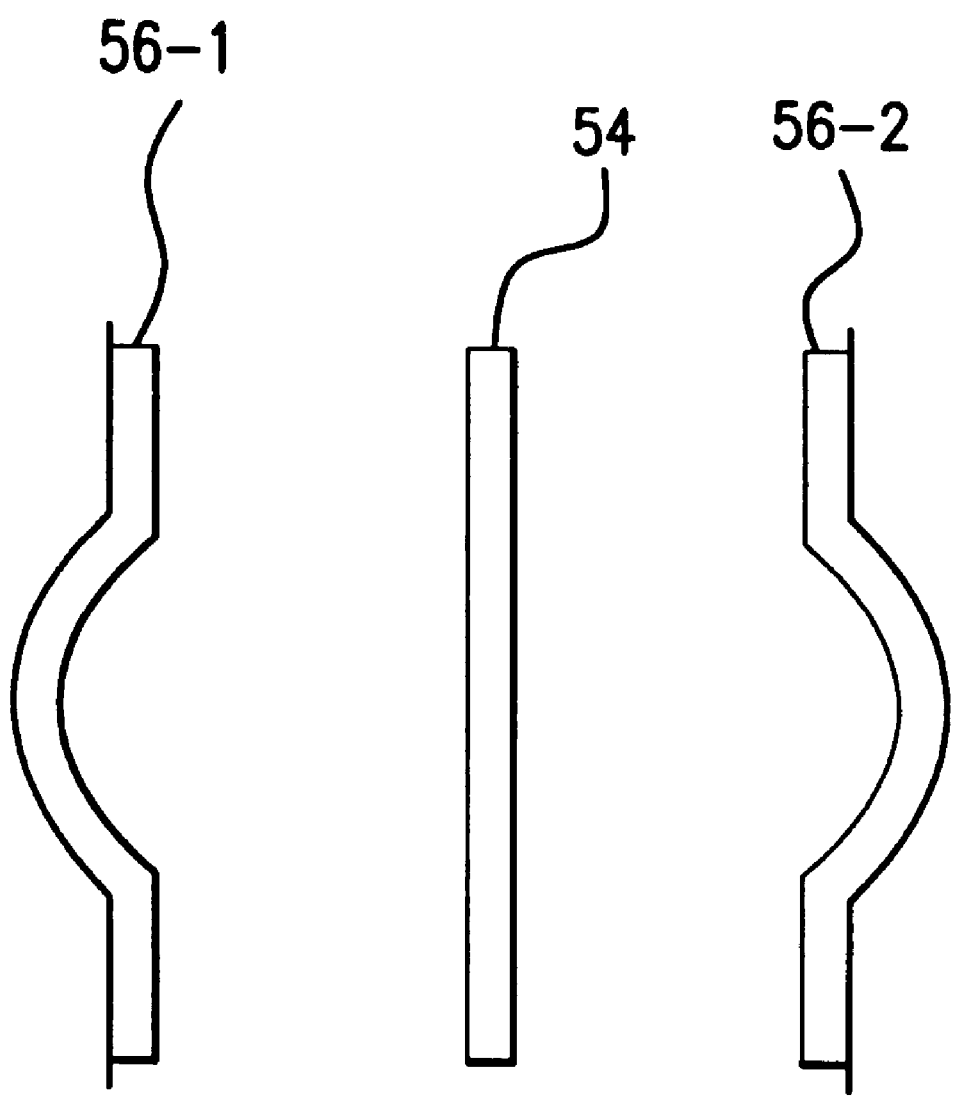
FIG. 8 is a schematic diagram illustrating a two cavity Fabry-Perot tunable filter.

Still other implementations, a dual or multi cavity tunable Fabry-Perot filter can be used as illustrated in FIG. 8. Here, mirror coatings 56-1, 56-2 are placed on two curved mirror structures along with a center flat mirror structure 54.

While this invention has been particularly shown and described with references to preferred embodiments thereof, it will be understood by those skilled in the art that various changes in form and details may be made therein without departing from the scope of the invention encompassed by the appended claims.

What is claimed is:

1. A Fabry-Perot filter, comprising:
    at least two mirror-structures defining at least one resonant cavity in which an optical distance between the two mirror structures is tunable;
    wherein the mirror structures each comprise two serially stacked single-band mirrors, which comprise a first mirror and a second mirror, the first mirror being reflective in a first spectral band and the second mirror being reflective in a second, different, spectral band; and
    wherein at least one of the mirror structures includes a membrane that is deflected by electrostatic forces to tune the optical distance between the two mirror structures.

2. A filter as claimed in claim 1, wherein the single-band mirrors are constructed from multilayer thin film dielectric mirror coatings.

3. A filter as claimed in claim 1, wherein the first spectral band is a reference band and the second spectral band is a signal band.

4. A filter as claimed in claim 1, wherein the first spectral band is a first signal band and the second spectral band is a second signal band.

5. A Fabry-Perot filter, comprising:
    at least two mirror structures defining at least one resonant cavity in which an optical distance between the two mirror structures is tunable;

wherein the mirror structures each comprise two serially stacked single-band mirrors, which comprise a first mirror and a second mirror, the first mirror being reflective in a first spectral band and the second mirror being reflective in a second, different, spectral band; and wherein one of the mirror structures is curved and another one of the mirror structures is relatively flat.

6. A Fabry-Perot filter, comprising:

at least two mirrors structures defining at least one resonant cavity in which an optical distance between the two mirror structures is tunable;

wherein the mirror structures each comprise two serially stacked single-band mirrors, wherein at least one of mirror structures comprises:
  a substrate;
  a first mirror comprising a multilayer thin film dielectric mirror coating that is reflective in a first spectral band;
  an index matching coating between the substrate and the first mirror; and
  a second mirror, being stacked on the first mirror, comprising a multilayer thin film dielectric mirror coating that is reflective in a second spectral band; and wherein an effective index of one of the first mirror or second mirror in the second spectral band or the first spectral band, respectively, is about one.

7. A filter as claimed in claim 6, wherein an effective index of the first mirror in the second spectral band is about one.

8. A filter as claimed in claim 7, wherein an effective index of the second mirror in the first spectral band is about one.

9. A filter as claimed in claim 6, wherein an effective index of the second mirror in the first spectral band is about one.

10. A filter as claimed in claim 6, wherein the index matching coating is matched to the second spectral band.

* * * * *